Dec. 28, 1943.   H. G. CARBUHN   2,337,646
PLANT THINNER
Original Filed Nov. 2, 1942   4 Sheets-Sheet 1
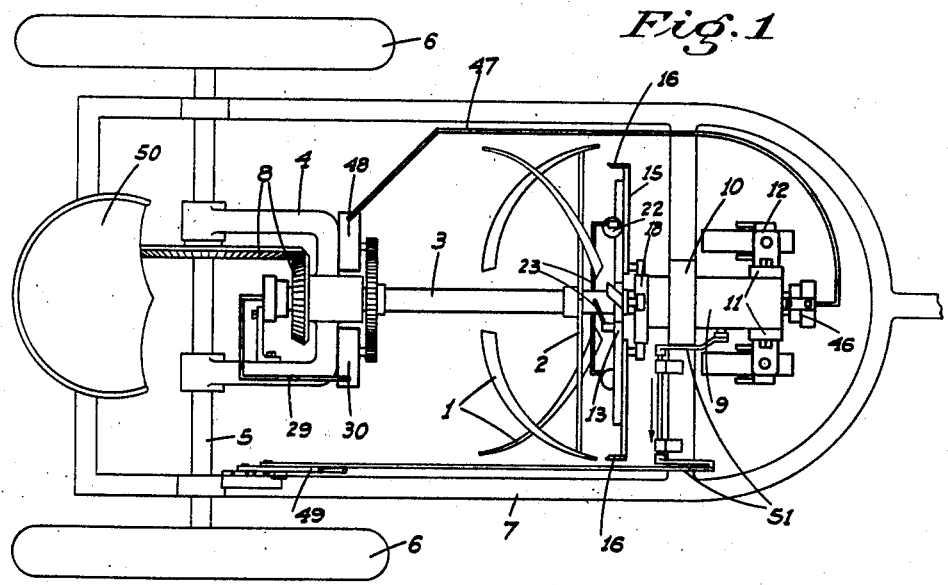
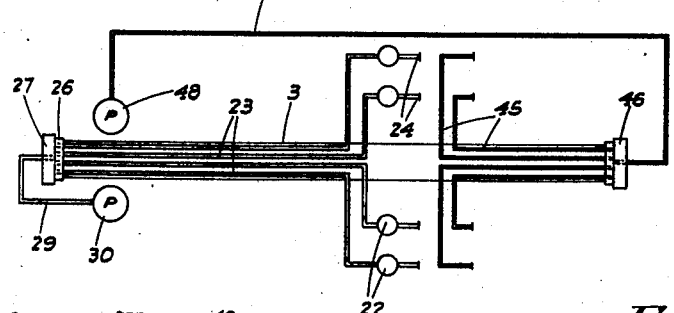
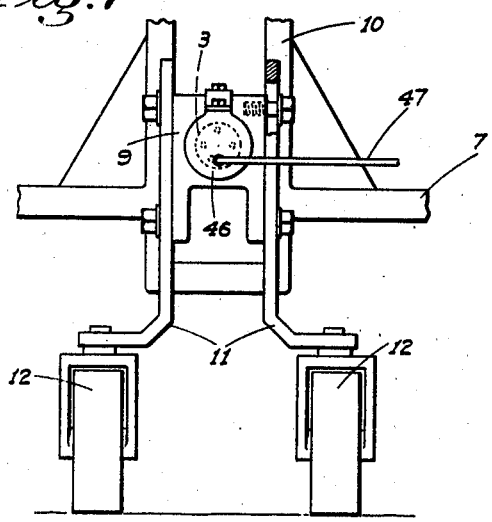
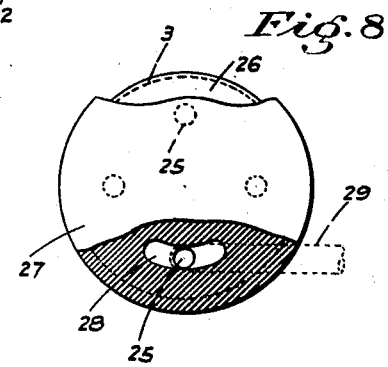
INVENTOR
H. G. Carbuhn
BY
ATTYS

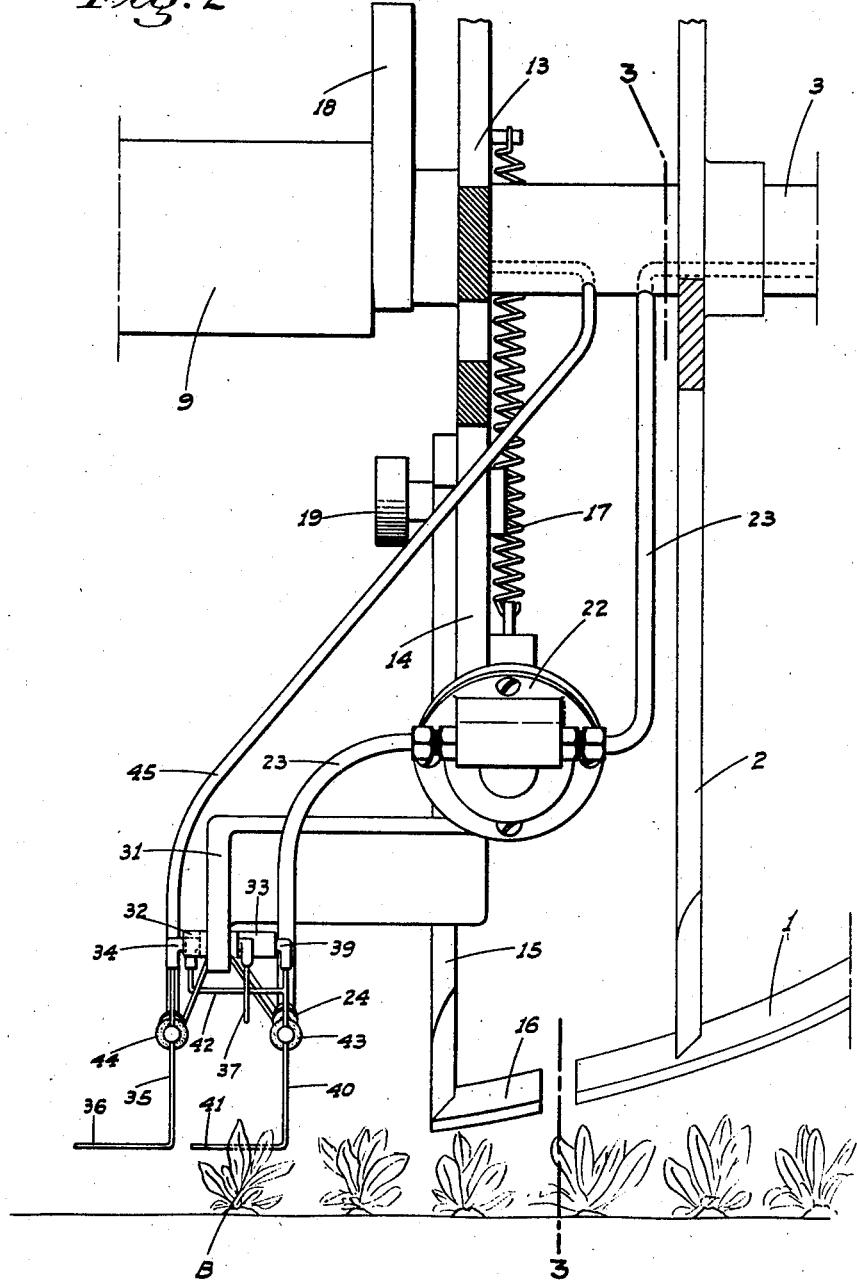

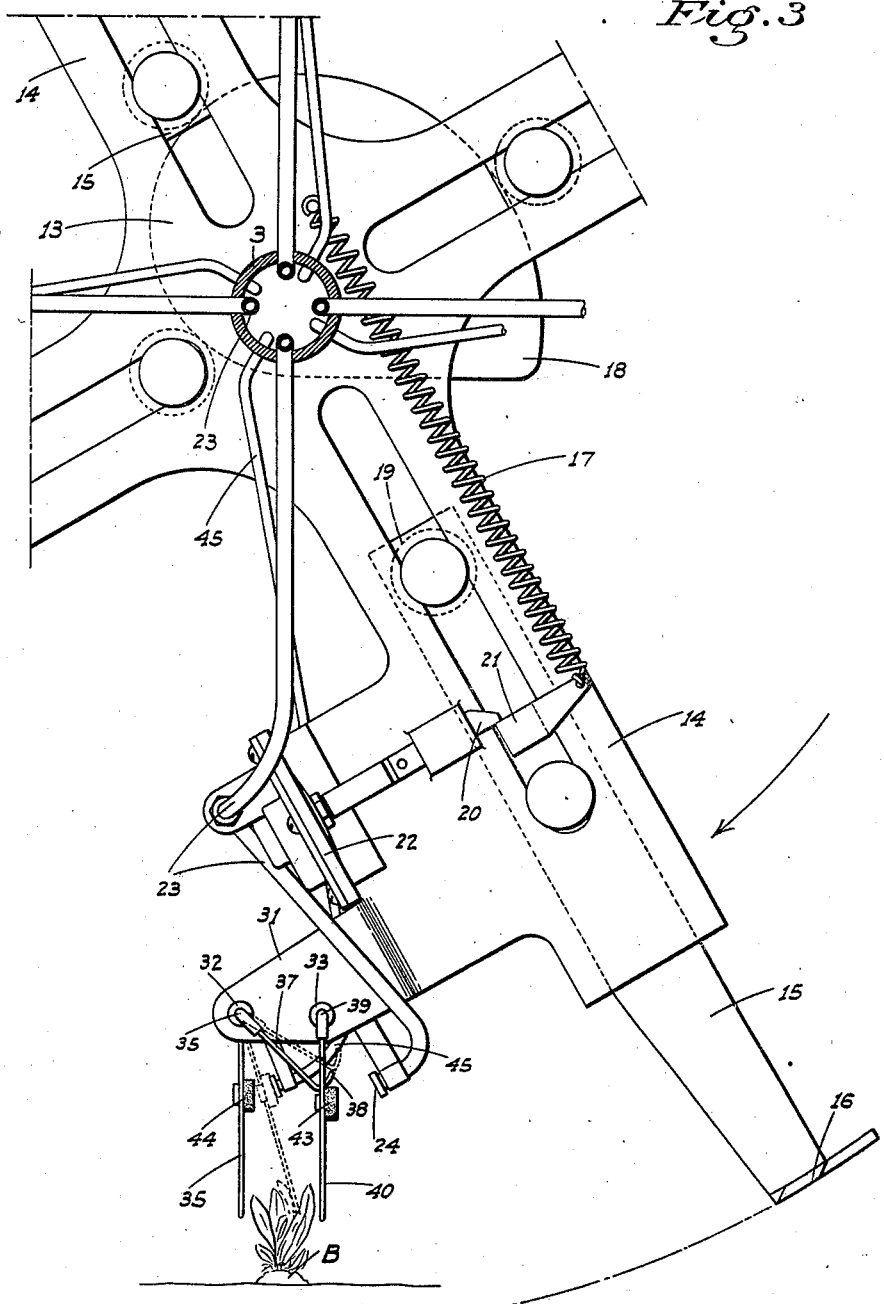

Dec. 28, 1943.      H. G. CARBUHN      2,337,646
PLANT THINNER
Original Filed Nov. 2, 1942      4 Sheets-Sheet 4
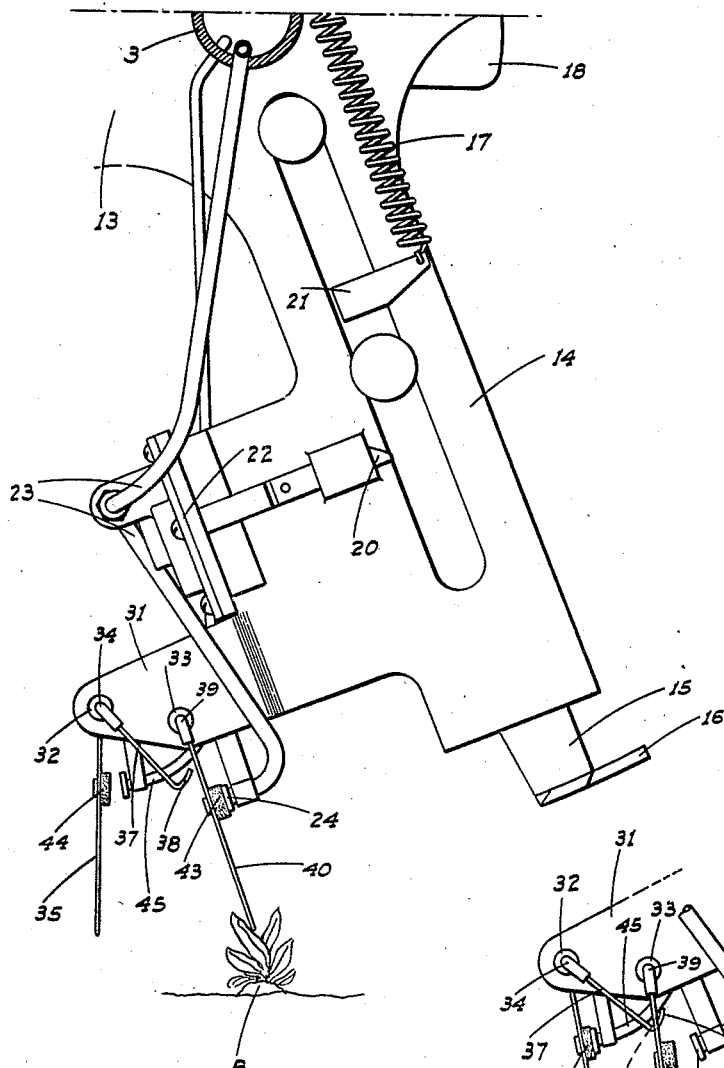
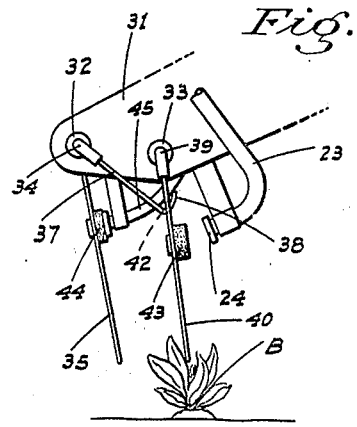
INVENTOR
H. G. Carbuhn
BY
ATTYS Patented Dec. 28, 1943

2,337,646

UNITED STATES PATENT OFFICE 2,337,646

PLANT THINNER

Harold G. Carbuhn, Napa, Calif., assignor of one-half to Harry D. Holt, Stockton, Calif.

Continuation of application Serial No. 464,262, November 2, 1942. This application July 31, 1943, Serial No. 496,880

14 Claims. (Cl. 97—15)

This invention relates in general to apparatus for thinning plants in row-crops; the instant application being a continuation of application, Serial No. 464,262, filed November 2, 1942.

While it is intended that this apparatus be capable of effective use for thinning plants of many different types of row crops, of which cotton is one example, the apparatus is especially designed for beet thinning, and is hereinafter described as used for this purpose.

It is customary to roughly thin out young beets by means of a blocking device which travels along the rows of beets and cuts out the majority of the beets in evenly spaced relation; the desideratum being to leave single beets spaced apart evenly and sufficiently to enable them to properly mature. It is impossible, however, to consistently attain this result with the ordinary blocker, and as a result manual thinning of the remaining beets is now resorted to.

The principal object of my invention is to eliminate this manual labor by providing a device, functioning in timed conjunction with the blocking machine as it moves along the row of beets, by means of which the few beets left by the blocker will be automatically thinned and all but one beet removed.

The device includes a pair of feeler elements spaced lengthwise of the machine a distance corresponding generally to the spacing of adjacent beets as initially planted and adapted to engage such beets in succession as the machine advances.

Another object of my invention is to provide thinning means, controlled in its operation by the feelers, so arranged that if there are beets in the path of and engaged by both feelers, one beet will then be removed; but if there is only a single beet in the path of and engaged by either feeler such beet will be left undisturbed.

A still further object of this invention is to provide plant thinning apparatus which includes a controlled power-actuated plant thinning mechanism, a feeler mechanism arranged to feel plants in a row with advance of the apparatus, and means responsive to the feeler mechanism arranged to control the operation of the thinning mechanism.

These objects I accomplish by means of such structure and relative arrangement of parts as will fully appear by a perusal of the following specification and claims.

In the drawings similar characters of reference indicate corresponding parts in the several views:

Figure 1 is a somewhat diagrammatic plan of a vehicle equipped with a blocking device, together with my improved thinning apparatus.

Figure 2 is a fragmentary enlarged side elevation of one of the thinning units showing its relationship to the adjacent blocking knife.

Figure 3 is a fragmentary transverse section on the line 3—3 of Fig. 2 looking forward and indicating the position of the forward feeler when the latter has crossed the row of beets without encountering a beet; the position of said feeler if engaging a beet being shown in dotted lines.

Figure 4 is a similar view showing the rear feeler as passing across and engaging a beet, and with the thinning knife retracted.

Figure 5 is a fragmentary view showing the locking of the rear feeler against movement by a beet, if the front feeler has first engaged a beet.

Figure 6 is a diagram of the vacuum feeler-holding and thinning knife control system.

Figure 7 is a fragmentary front end view of the machine.

Figure 8 is an end view, partly broken away and in section, of a rotary valve for controlling the negative or vacuum pressure to the various thinning units.

Referring now more particularly to the characters of reference on the drawings, my improved thinning apparatus is mounted in conjunction with a conventional type of beet blocker which comprises essentially a plurality, for instance four, of circumferentially and longitudinally extending spaced knives 1 mounted on a spider 2 fixed on a rotary shaft 3 which extends lengthwise of the row of beets to be blocked and thinned. As here shown this shaft is journaled at its rear end in a yoke 4 swung on the axle 5 of the rear wheels 6 of the frame 7 of the machine which is adapted to be moved along the row at a suitable speed. The shaft is driven from the axle at a predetermined speed ratio by gearing 8.

At its forward end, some distance ahead of the spider, the shaft is journaled in a block 9 vertically slidable in a guideway 10 in the frame 7 and adjustably supported from the ground by arms 11 clamped against opposite sides of said block, and which carry relatively small gauge caster wheels 12 on their lower end; said wheels straddling the row of beets.

As the machine advances along the row the knives 1 rotate and cut through a transverse swath, blocking out the majority of the beets, but leaving a space containing one or two beets between adjacent swaths.

My thinning apparatus, which includes a mounting spider 13 mounted on the shaft 3 ahead of the blocking device, is adapted to operate on such remaining beets and comprises as many individual units as there are knives 1. Since each unit is a duplicate of the other it is sufficient to show and describe in detail a single unit only.

The spider 13 includes radial arms 14, one for each thinning unit. Mounted on each arm 14 for radial movement is a bar 15 carrying a short knife 16 on the outer end shaped and positioned to cut through the ground in the path of a single beet immediately ahead of that engaged by the adjacent blocking knife following behind. A tension spring 17 between the spider and knife bar tends to retract the latter so that the knife clears the ground, and the bar is advanced against the resistance of the spring and so as to dispose it in a ground engaging position by a cam 18 about the shaft and fixed on the block 9, and engaged by a roller 19 mounted on the adjacent end of the knife bar. This cam is designed so as to gradually advance the knife bar with the rotation of the shaft, if such knife bar has been previously retracted, and move the same to a fully advanced position about 90° ahead of the ground engaging position of the knife; while allowing the knife bar to be then fully retracted by the spring before it reaches a ground engaging position. The knife bar is normally held against retraction by means of a latch tongue 20 slidably mounted on the arm 14 at right angles to the knife bar and engaging a stop 21 on the latter. The tongue is connected to a vacuum actuated cylinder unit 22 mounted on the arm and arranged so that when subjected to vacuum or negative pressure, it will cause the tongue to be retracted from the stop and enable the spring to retract the knife bar if the position of the latter relative to the cam at the time allows the spring to do so.

The cylinder unit is interposed in a vacuum line 23, the forward end of which is open and terminates adjacent the arm 14, as at 24, while its rear end is disposed adjacent the rear end of the shaft 3. Here the line 23 is connected to a port 25 in the body 26 of a rotary valve, said body being secured to the shaft. The valve includes a stationary head 27 having an arcuate slot 28 positioned to register with the port when the knife approaches the ground and for a short arcuate distance thereafter. A pipe 29 leads from the slot 28 to a vacuum pump 30, which is here shown as being mounted in fixed connection with the bracket 4 and driven from the shaft 3. It will be understood that while there may be only one slot in the valve head, there are as many ports 25 in the valve body as there are thinning units, these ports being evenly spaced about the body and each one in succession registering with the slot. The vacuum lines are preferably in the form of tubing such as is commonly used, and for convenience such tubing may pass through the shaft which is hollow, as shown.

It will thus be seen that if, when the valve slot registers with the port 25, the vacuum line is still open at its forward end, there will be no effect on the cylinder unit 22 and the latch tongue will remain advanced in its holding position. The knife bar will then remain with the knife in a ground engaging position and will cut through the ground as the shaft 3 rotates, removing or thinning out any beet in its path. If, however, as the knife approaches the ground the end 24 of the vacuum line is closed the negative pressure in the line will act on the cylinder unit to retract the latch tongue, allowing the spring 17 to immediately retract the knife bar and withdraw the knife clear of the ground. The knife will then swing across the row of beets without engaging the same, since the functioning of the cylinder unit takes place before the knife actually reaches the ground. With continued rotation of the shaft the knife bar will be again advanced by the cam until it is re-engaged by the latch before it arrives at a position for a subsequent thinning operation.

The vacuum line is thus closed or held open by the presence or absence of beets in the path of the knife by the following means:

The arm 14 is rigid with a laterally projecting bracket 31 disposed ahead of the knife bar both with respect to its rotative and longitudinal movement. This bracket carries bushings 32 and 33 disposed parallel to the shaft 3 and spaced circumferentially relative to the shaft, the bushing 32 being ahead of the bushing 33 relative to the direction of rotation of the shaft. A shaft 34 is freely turnable in the bushing 32 and on its forward end carries a depending feeler 35 having a horizontal forward extension 36 on its lower end disposed parallel to its shaft. On its rear end the shaft 34 has a relatively short depending arm 37 terminating in a hook 38 which faces upwardly and opposite to the direction of rotation of the thinning unit.

A shaft 39 is freely turnable in the bushing 33 and on its rear end carries a depending feeler 40 having a forward horizontal extension 41 on its lower end. A cross bar 42 rigid with the feeler 40 above the extension 41 extends forwardly in the path of backward swinging movement of the hook 38. The feelers are spaced apart approximately the spacing of adjacent beets, and their radial length is such that when freely hanging and adjacent the ground they will engage and be deflected by beets in their path. The feeler 40 has a cap element 43 secured thereon and facing the open end 24 of the vacuum line 23 in position to close said end upon backward swinging movement of the feeler a predetermined distance. Similarly the feeler 35 has a cap 44 intermediate its ends facing and adapted to close the normally open end of a holding vacuum line 45 upon backward swinging movement of the feeler a predetermined distance. This line 45 extends to a rotary valve unit 46 at the forward end of the shaft 3 similar to the valve already described, and a pipe 47 leads from said valve 46 to another driven vacuum pump 48. The valve unit 46 is arranged to establish communication between the pump and the line 45 for the same duration and at the same relative position of the knife bar as described in connection with the first named valve. It will here be noted that the thinning knife 16 is disposed back of the rear feeler 40, both longitudinally and transversely of the machine, in such relation to the longitudinal speed of the machine and that of the rotation of the shaft 3 and knife, as to bring said knife in position to cut through the beet just engaged by the rear feeler.

It is necessary, when turning at the end of a row and when transporting the machine, to lift the knife unit clear of the ground. Suitable means will therefore be provided to effect such lifting, such as a hand lever 49 mounted on frame 7 convenient to the operator's seat 50 thereon, and operatively connected to the block 9 by a suitable pull-linkage and arm or lever assembly 51 as indicated diagrammatically in Fig. 1.

In the operation of the apparatus, if the forward feeler element 36 engages a beet, said feeler is swung back and its cap 44 closes against the vacuum line 45, and the feeler is held from retraction by the vacuum in said line, which is the sole function of the same. This swings the hook 38 up and into the path of the arm 43 of the rear feeler. Said rear feeler element 41, if engaging a beet, cannot then close against the open end 24 of the vacuum line 23, since the hook 38, engaging the arm 42, prevents such movement of the rear feeler, as shown in Fig. 5. The vacuum line 23 therefore remains open and the knife remains in a cutting position, cutting through said last named beet and leaving the forward one in place. If the forward feeler does not engage a beet, the rear feeler remains free to swing and if it then engages a beet, said rear feeler will be swung back and its cap 43 will close the open end 24 of the vacuum line 23, as shown in Fig. 4. The latch will then be retracted, tripping the knife and preventing said beet from being cut, and thus leaving the same in the ground. With either condition therefore a single beet only will be left in place, as is desirable. If there is a beet in the path of the forward feeler but none in the path of the rear feeler, the knife will not be retracted, but this is immaterial since the knife will merely cut through the bare ground and the remaining beet will not be disturbed.

When the vacuum is cut off by the action of the rotary valves, after the feelers have functioned and are moving up with the further rotation of the unit, the feelers are then free to swing and reassume their normal depending positions before a subsequent feeling operation. The vacuum cylinder unit 22 is also released, allowing the latch tongue 20, as previously retracted, to again advance into position to re-engage the stop 21 when the knife bar is again advanced by the cam, in the event that said knife bar was previously retracted.

While I here show four blocking knives and a corresponding number of thinning units, it will be evident that this number may be changed according to the relative speed of advance and rotation of the apparatus.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A plant thinner comprising a rotary unit disposed with its axis substantially horizontal, means mounting the unit for rotation and for movement along the ground, the unit including an arm, a thinning knife, means mounting the knife on the arm for movement relative thereto from an advanced ground engaging position to a retracted position clear of the same upon rotation of the arm about said axis, means to advance the knife, releasable means to hold the knife advanced, means acting to retract the knife when the holding means is released, means to release the holding means, feeler controlled means to place said release means in operation before the knife reaches a ground engaging position and adapted to be actuated by a plant in the path of the knife, and means actuated by a plant immediately adjacent the first named plant to prevent said last named means from being thus actuated.

2. A device for cutting out one of two adjacent plants in a row comprising, with a frame movable along the ground lengthwise of and above the row, a knife, means mounting the knife in connection with the frame for movement transversely thereof to cut across the row, means to advance the knife to a cutting position, means tending to retract the knife to a non-cutting position, releasable holding means normally preventing retraction of the knife, means to release the holding means, feeler controlled means to place the release means in operation before the knife reaches a cutting position and adapted to be actuated by a plant in the path of the knife and means actuated by an adjacent plant to prevent said last named means from being thus actuated.

3. A plant thinner comprising a rotary unit disposed with its axis substantially horizontal, means mounting the unit for rotation and for movement along the ground, the unit including an arm, a thinning knife, means mounting the knife on the arm for movement relative thereto from an advanced ground engaging position to a retracted position clear of the ground upon rotation of the arm about said axis, means to advance the knife, releasable means to hold the knife advanced, means acting to retract the knife when the holding means is released, means to release the holding means, a pair of independent feelers movable relative to the arm and mounted in connection with said arm in front of the knife to separately engage adjacent plants upon rotation of the arm, means between one feeler and the release means to place the latter in operation upon movement of said one feeler by engagement with a plant in the path of the knife, and means between the feelers preventing such movement of the one feeler if the other feeler first engages a plant immediately adjacent the first named plant.

4. A structure as in claim 3 in which the release means includes a suction actuated unit and a normally open suction line leading to the unit; said movement of the one feeler closing the suction line.

5. A plant thinner comprising a rotary unit disposed with its axis substantially horizontal, means mounting the unit for rotation and for movement along the ground, the unit including an arm, a thinning knife, means mounting the knife on the arm for movement relative thereto from an advanced ground engaging position to a retracted position clear of the same upon rotation of the arm about said axis, means to advance the knife, releasable means to hold the knife advanced, means acting to retract the knife when the holding means is released, means to release the holding means, a pair of independent feelers movable relative to the arm and mounted in connection with said arm in front of the knife and spaced lengthwise of the direction of travel of the machine to separately engage correspondingly spaced adjacent plants in a row upon rotation of the arm, the feelers being swingable in a vertical transverse plane, means between the rearmost feeler and the release means to place the latter in operation upon swinging of said feeler in a direction counter to the rotation of the knife upon engagement with a plant in the path of the knife, and means between the feelers to prevent the rearmost feeler from thus swinging and functioning upon swinging of the foremost feeler in a counter direction by engagement with a plant ahead of the knife and prior to any swinging impulse being imparted to the rearmost feeler.

6. A structure as in claim 5 in which the feelers each includes a freely turnable mounting shaft disposed parallel to the axis of rotation of the arm and said last named means includes a hook disposed radially of and rigid with the shaft of the foremost feeler, and a hook engaging element rigid with the rearmost feeler in position to be caught by the hook after the foremost feeler has swung in said direction but clear of the hook when the foremost feeler is in a normal position.

7. A plant thinner comprising a rotary unit disposed with its axis substantially horizontal, means mounting the unit for rotation and for movement along the ground, the unit including an arm, a thinning knife, means mounting the knife on the arm for movement relative thereto from an advanced ground engaging position to a retracted position clear of the same upon rotation of the arm about said axis, the knife mounting means including a bar slidable on the arm radially of the unit, means to advance the bar, a releasable latch to hold the bar advanced, a spring to retract the bar when the latch is released, a suction actuated device to release the latch, a normally open suction line leading to the device, means to close the line before the knife reaches a ground engaging position actuated by a plant in the path of the knife, and means actuated by a plant immediately adjacent the first named plant to prevent said last named means from being thus actuated.

8. A structure as in claim 7 with means to create a tendency to suction in the line during the arcuate movement of the bar and knife adjacent a downward vertical position.

9. A plant thinner comprising a rotary unit disposed with its axis substantially horizontal, means mounting the unit for rotation and for movement along the ground, the unit including an arm, a thinning knife, means mounting the knife on the arm for movement relative thereto from an advanced ground engaging position to a retracted position clear of the same upon rotation of the arm about said axis, the knife mounting means including a bar slidable on the arm radially of the unit, means to advance the bar, a releasable latch to hold the bar advanced, a spring to retract the bar when the latch is released, a suction actuated device to release the latch, a normally open suction line in which the device is interposed and having a portion normally open at one end, a pair of independent feelers disposed in longitudinally spaced relation to the axis of the arm and in front of the knife, means mounting the feelers for swinging movement in a vertical transverse plane, the feelers being adapted to successively engage adjacent plants, the rearmost one of which is in the path of the knife whereby the feelers will be swung, upon rotation of the arm and when engaging such plants, in a direction counter to the direction of rotation of the arm, a closure cap for the open end of the vacuum line portion mounted on the rearmost feeler in position to engage said open end upon swinging of said feeler and means between the feelers to prevent such swinging of the rearmost feeler if the foremost feeler engages and is swung by a plant.

10. A structure as in claim 9, with additional means releasably holding the foremost feeler in a swung position.

11. A plant thinning apparatus comprising, with a supporting unit movable lengthwise of a row of plants, a movable feeler mounted on the unit to engage and be moved by a plant upon movement of the unit along the row, another movable feeler mounted on the unit to engage and be moved by an adjacent plant, a thinning knife on the unit adapted to engage and cut the last named plant and means brought into operation by engagement of said other feeler with the corresponding plant when the one feeler fails to move due to lack of a plant in its path, to render the knife inoperative.

12. A plant thinning apparatus comprising, with a supporting unit movable lengthwise of a row of plants, a movable feeler mounted on the unit to engage and be moved by a plant upon movement of the unit along the row, another movable feeler mounted on the unit to engage and be moved by an adjacent plant, a thinning knife movably mounted on the unit and normally positioned to engage and cut through one of said plants and instrumentalities controlled by feeler movement to move the knife to an inoperative position if only one feeler engages and is moved by a plant, while leaving the knife in an operative position if both feelers engage and are moved by a corresponding number of plants.

13. A plant thinning mechanism comprising, with a supporting unit movable lengthwise of a plant row, a constantly driven thinning mechanism mounted on the support and arranged to thin plants in said row with advance of the support, said thinning mechanism including a thinning knife movable between an advanced operative position and a retracted inoperative position, a feeler mechanism mounted on and moving with said thinning mechanism and positioned to engage plants in the row ahead of said knife, and means controlled by the feeler mechanism to move the knife to an inoperative position upon engagement of the feeler mechanism with a predetermined number of plants at a predetermined point in the row.

14. A plant thinning mechanism comprising, with a supporting unit movable lengthwise of a plant row, a constantly driven thinning mechanism mounted on the support and arranged to thin plants in said row with advance of the support, said thinning mechanism including a thinning knife movable between an advanced operative position and a retracted inoperative position, a feeler mechanism mounted on and moving with said thinning mechanism and including a pair of feelers positioned to engage adjacent plants in the row ahead of said knife, and means controlled by the feeler mechanism functioning to permit the knife to remain in operative position upon engagement of each feeler with a plant, and to move the knife to an inoperative position in the event that a certain one of said feelers fails to engage a plant.

HAROLD G. CARBUHN.